Figure 1:
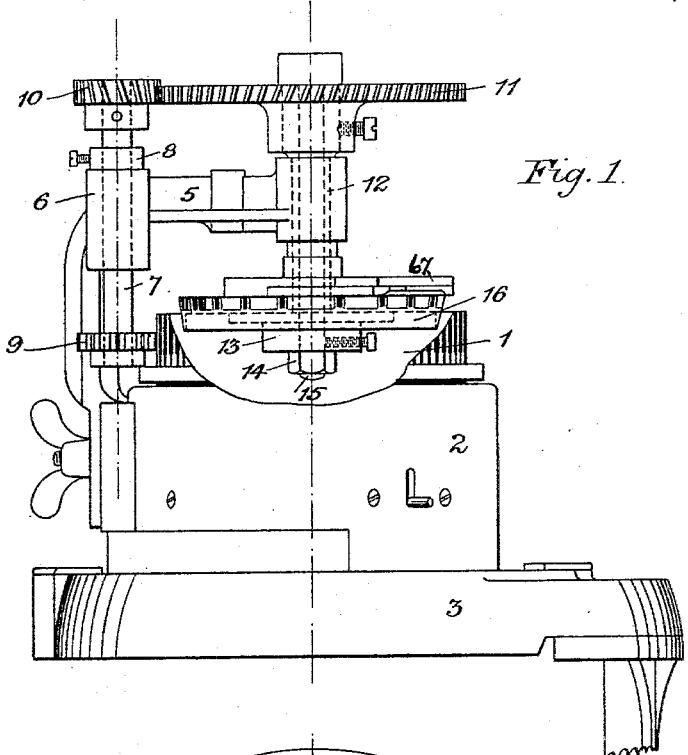

(No Model.)   6 Sheets—Sheet 1.

G. F. STURGESS.
KNITTING MACHINE.

No. 597,092.   Patented Jan. 11, 1898.

Witnesses.
Thomas Scott
Walter Edwin Sturgess

Inventor.
George Frederick Sturgess (No Model.) 6 Sheets—Sheet 2.
G. F. STURGESS.
KNITTING MACHINE.
No. 597,092. Patented Jan. 11, 1898.
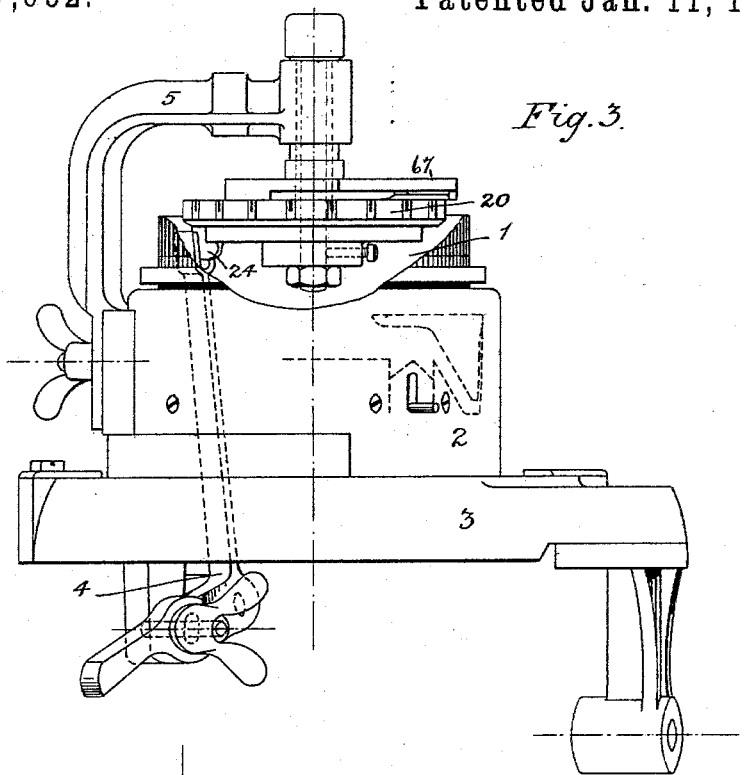
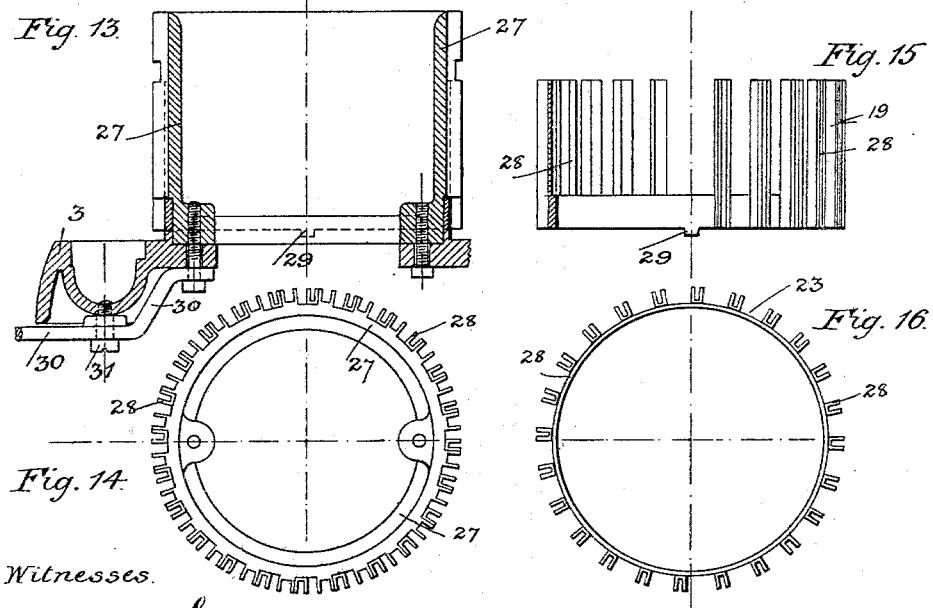
Witnesses.
Thomas Scott
Walter Edwin Sturgess
Inventor.
George Frederick Sturgess.

(No Model.)
6 Sheets—Sheet 3.
G. F. STURGESS.
KNITTING MACHINE.
No. 597,092. Patented Jan. 11, 1898.
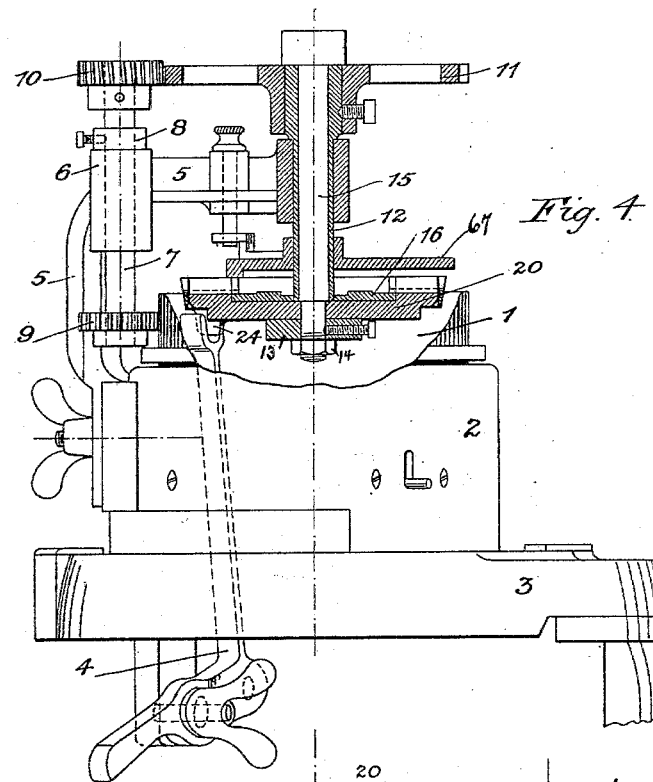
Fig. 4.
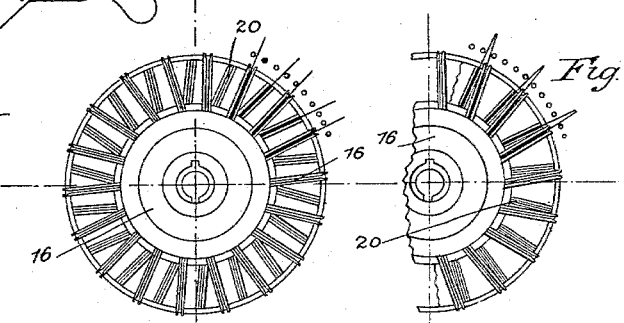
Fig. 5. Fig. 6.
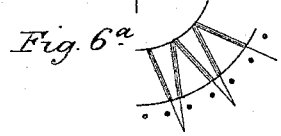 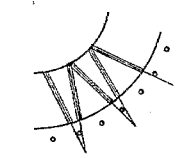
Fig. 6ᵃ. Fig. 6ᵇ.
Witnesses.
Thomas Scott
Walter Edwin Sturgess.
Inventor.
George Frederick Sturgess.

(No Model.) 6 Sheets—Sheet 4.
G. F. STURGESS.
KNITTING MACHINE.
No. 597,092. Patented Jan. 11, 1898.
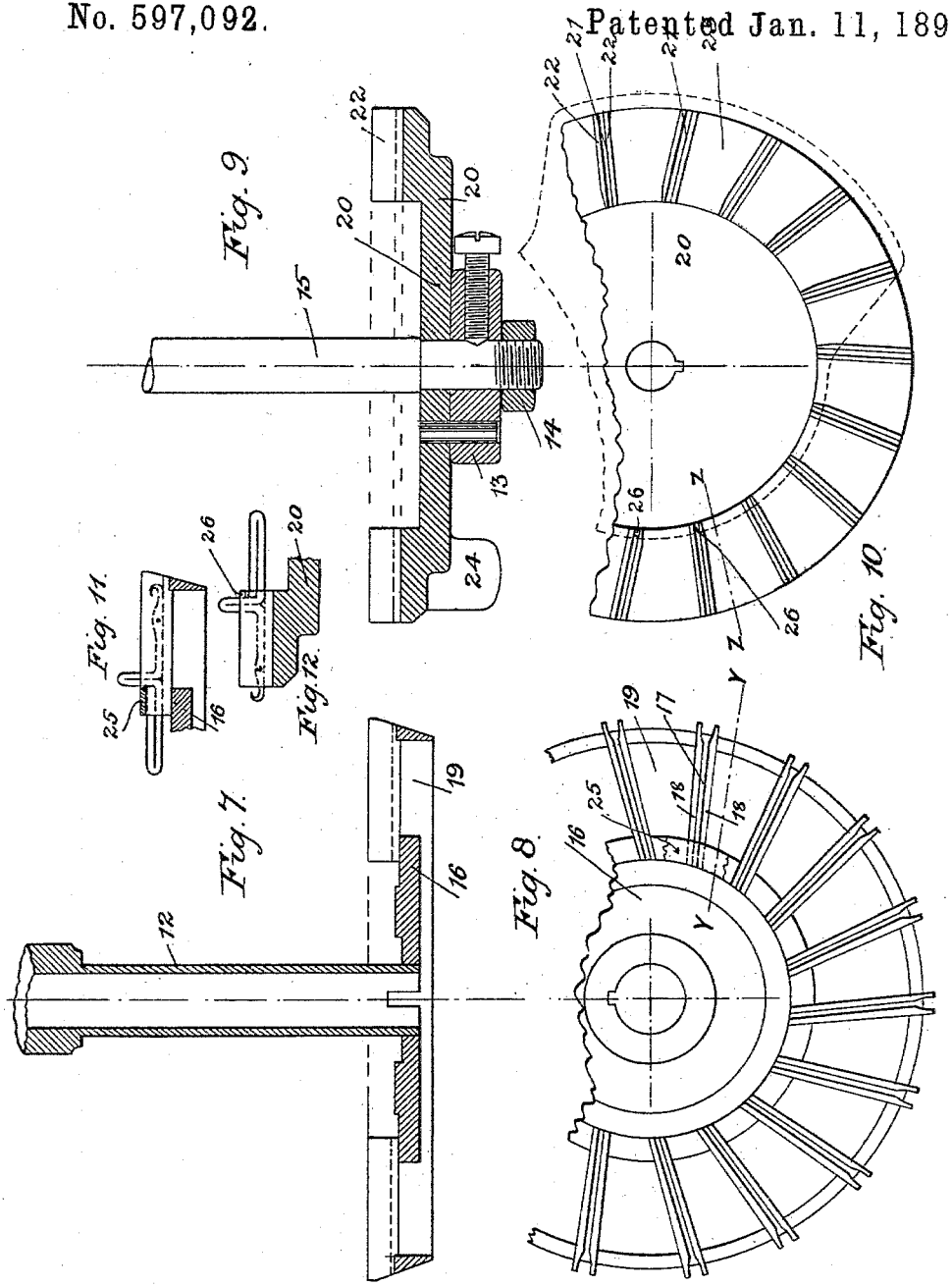
Witnesses.
Thomas Scott
Walter Edwin Sturgess
Inventor.
George Frederick Sturgess.

(No Model.) 6 Sheets—Sheet 5.
G. F. STURGESS.
KNITTING MACHINE.
No. 597,092. Patented Jan. 11, 1898.
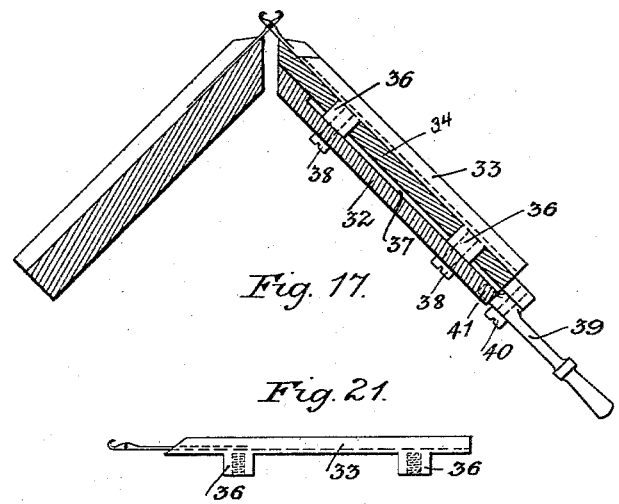
Fig. 17.
Fig. 21.
Fig. 18.
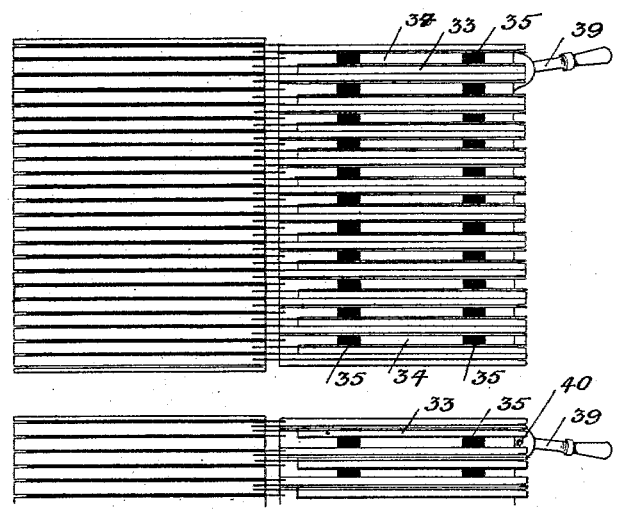
Fig. 19.
Witnesses,
Thomas Scott
Walter Edwin Sturgess
Inventor.
George Frederick Sturgess

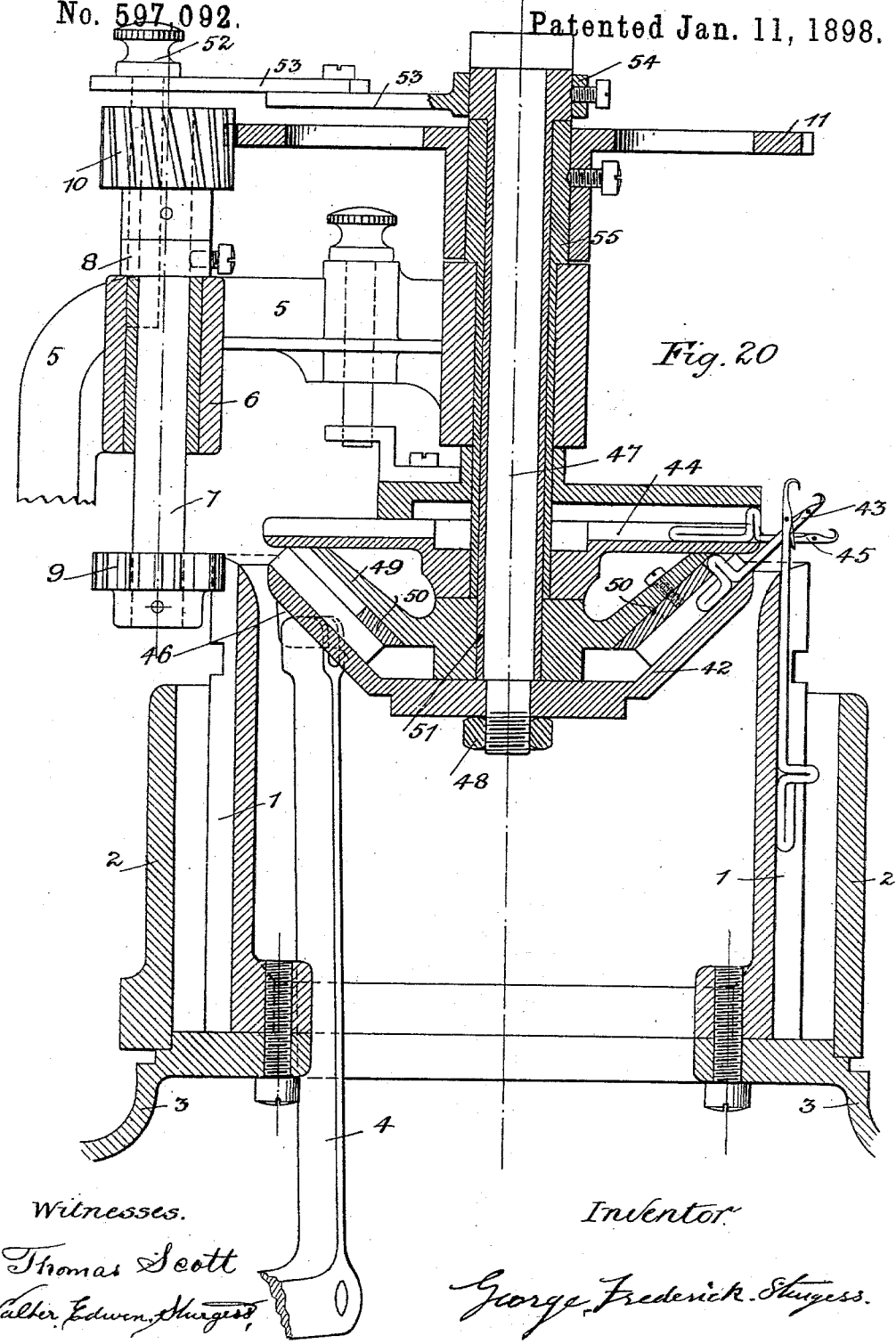

United States Patent Office.

GEORGE FREDERICK STURGESS, OF LEICESTER, ENGLAND.

KNITTING-MACHINE.

SPECIFICATION forming part of Letters Patent No. 597,092, dated January 11, 1898.

Application filed February 11, 1897. Serial No. 623,021. (No model.) Patented in England November 20, 1894, No. 22,373.

*To all whom it may concern:*

Be it known that I, GEORGE FREDERICK STURGESS, hosier's engineer, a subject of the Queen of England, residing at the Ingle Nook, Leicester, in the county of Leicester, England, have invented certain new and useful Improvements in Knitting-Machines, (for which I have obtained a patent in Great Britain, No. 22,373, bearing date November 20, 1894,) of which the following is a specification.

This invention relates to knitting-machines in which a set of plain and a set of rib needles are used; and the chief object is to provide useful improvements whereby the whole of the fabric produced may be converted from one pattern of rib to another pattern of rib. For instance, upon this improved machine a fabric can be made entirely of two-one rib pattern, succeeded by a fabric made entirely of four-two rib pattern, and such like complete changes of rib pattern can be brought about without taking the loops off the needles.

The invention consists of a compound needle-bed arranged to unite for the support of one of the two sets of needles employed in such a manner that alternating needles can be adjusted laterally with reference to neighboring needles of the same set, or such compound needle-bed may be separated into two needle-beds, either of which may be used separately and independently of the other.

The invention further consists of gear-wheels adapted to hold a ribber-needle bed fixed to a plain-needle bed—that is to say, adapted to preserve a fixed relation between a ribber-needle bed and a plain-needle bed to maintain a correct relation of the needles circularly.

The invention also consists of other features, as hereinafter claimed.

Reference is to be had to the accompanying drawings, forming a part of this specification, in which similar numerals of reference indicate corresponding parts.

Figure 2:
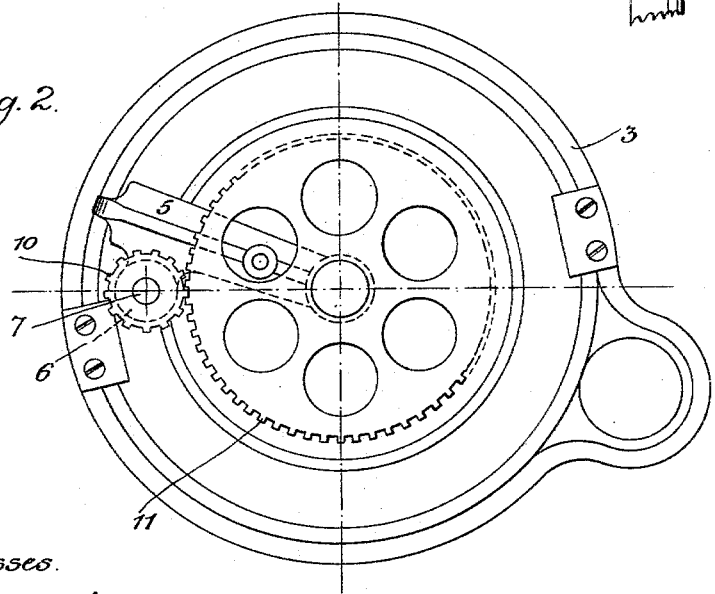

Figure 1 is a view in elevation, showing a knitting-machine having a skeleton rib-needle bed applied singly, also the gear-wheels for maintaining a fixed relation of the rib-bed with the plain-needle bed, detailed parts of the ordinary knitting-machine being omitted. Fig. 2 is a plan of the same. Fig. 3 is a view in elevation, showing a knitting-machine having a solid rib-needle bed applied singly and the ordinary dial-post for maintaining a fixed relation of the said rib-bed with the plain-needle bed. Fig. 4 is a view in elevation, showing a knitting-machine having my solid rib-needle bed and my skeleton rib-needle bed superimposed to form a compound needle-bed to receive the rib set of needles. Fig. 5 is a plan of the two rib-needle beds united, with the alternating tricks in position for single ribs—say two-one rib. The dots represent the plain needles, and the strokes represent the ribber-needles. Fig. 6 is a similar view with the alternating tricks in position for broad ribs—say four-two rib. The dots represent the plain needles, and the strokes represent the ribber-needles. Figs. $6^a$ and $6^b$ show the needle-tricks disposed at an angle to the radius of the dial needle-plates and show how by converging the needles to each other a change may be made from two-two to one-one pattern of rib by shogging the tricks collectively without altering the position of the tricks relative to each other. Fig. 7 is a view in sectional elevation, showing a rib skeleton bed and supporting-tube. Fig. 8 is a plan of the same with the tube removed. Fig. 9 is a view in sectional elevation, showing a rib solid bed and a supporting-spindle. Fig. 10 is a plan of the same with the spindle removed. Fig. 11 is a view in section, on the line Y Y, of the skeleton bed, Fig. 8, showing how the tricks are connected to each other by a metal ring soldered thereto. Fig. 12 is a view in cross-section, on the line Z Z, of the solid bed, Fig. 10, showing how the tricks are connected together by the insertion of a metal piece. Fig. 13 is a sectional elevation, and Fig. 14 a plan, of my compound bed in a cylindrical form, the two beds being placed one upon the other to receive a set of plain needles. Fig. 15 is an elevation, partly in section, and Fig. 16 a plan, showing the cylindrical skeleton bed alone. Fig. 17 is a view in cross-section, showing my compound bed in a straight form, having an ordinary needle-bed to receive the plain needles and a solid and skeleton needle-bed combined to receive the rib-needles. Fig. 18 is a plan showing the alternating tricks and needles separated for one-one rib. Fig. 19 is also a plan showing the alternating tricks and needles brought together for two-two rib. Fig. 20 is a sectional elevation showing a modification of my invention in which one bed is in the form of an ordinary dial and one bed in the form of an ordinary cone and the means of uniting them to accomplish the object of this invention, also the gear-wheels for holding the dial fixed and the ordinary dial-post for holding the cone fixed with the cylinder-bed. Fig. 21 is a detail showing one of the tricks and its needle in the form of bed shown in Figs. 17, 18, and 19.

In Figs. 1, 2, and 3 it will be seen that the machine is of the ordinary type and has a needle-cylinder 1, cam-cylinder 2, framework 3, adjustable dial-post 4, and a ribber-supporting arm 5, and the ordinary cam-cap is shown at 67.

In Fig. 1 a bearing 6 is secured to the ribber-arm 5, in which revolves the vertical spindle 7, provided with a collar 8 to keep the said spindle in position.

To the bottom of the spindle 7 is secured by a taper-pin a gear-wheel 9, which meshes with the cylindrical needle-bed 1, and to the top is secured by a taper-pin a gear-wheel 10, which meshes with a gear-wheel 11. Gear-wheel 11 is secured to a tube 12 by screws, and the tube 12 holds the skeleton bed by a key in a slot of the bed and the washer 13 and nut 14 on the spindle 15. Gear-wheels 9 and 10 are carried round the cylinder 1 and gear-wheel 11 by the ribber-arm 5 on the rotatable cam-cylinder 2. By this arrangement of gear-wheels a correct fixed relation is maintained circularly between a ribber-needle bed and a plain-needle bed and their needles.

In Figs. 1, 7, and 8 is shown a skeleton rib-bed 16, having a circle of needle-tricks 17, set apart, adapted to be superimposed upon and unite with the solid rib-needle bed 20. Each needle-trick has a wall 18 on each side of the saw-gate independent of the walls of neighboring tricks, the base of the bed being cut away, making apertures 19, through which the tricks of the solid beds protrude when the beds are united in such a manner that alternating tricks and their needles can be adjusted laterally to the neighboring tricks and their needles. This skeleton bed 16 is keyed to the tube 12 and secured by a nut 14 on the spindle 15 and is held in fixed relation to the cylinder 1 by the intervention of the gear-wheels 9, 10, and 11, as aforesaid, and may be used independent of or united to the solid bed.

In Figs. 3, 9, and 10 is shown a solid rib-needle bed 20, having a set of needle-tricks 21, set apart, adapted to unite with a skeleton rib-bed 16, aforementioned. Each needle-trick has a wall 22 on each side of the saw-gate independent of the walls of neighboring tricks, the intervening metal being cut away, leaving spaces 23, upon which the tricks of the skeleton bed rest when the beds are united, for the purpose aforementioned.

The solid bed 20 is attached to the rib-spindle 15 by the nut 14 and has a lug 24 on its under side in the ordinary manner and may be used independent of or united with the skeleton bed. Lug 24 engages with the ordinary dial-post 4, and the bed 20 may be adjusted circularly by shogging the dial-post 4 in the usual manner.

In an ordinary knitting-machine for making single ribs, such as four-one pattern rib, either the solid or the skeleton needle-bed may be used alone, as seen in Figs. 1 and 3. In Fig. 4 the skeleton and the solid beds are shown applied in their dual form and adapted to receive and support between them one set of needles on one level, alternate needles of the said set being put into the skeleton and alternate needles being put into the solid bed.

When converting the beds from a single to a dual or compound bed, the skeleton bed is placed upon the solid bed, as shown in Figs. 4, 5, and 6, the whole being secured to the tube 12 and spindle 15 by the washer 13 and nut 14, as aforesaid. When the solid and skeleton needle-beds are united in their dual form, the tricks of one bed alternate with the tricks of the other bed, and their needles pair up in such a manner that two rib-needles can be worked through the space alloted to one rib-needle heretofore in machines that are coarse enough to allow it. By thus cutting the tricks at an angle to the radius of the dial needle-plate I can change from two-two to one-one rib by shogging the united beds collectively, and in the case of a machine in which the gage gives sufficient room for shogging the needles collectively I use a solid bed having the tricks cut at an angle to the radius, as seen in Figs. 6$^a$ and 6$^b$. Fig. 6$^a$ shows the needles arranged for two-two rib. Fig. 6$^b$ shows the needles shogged collectively into position for one-one rib. To move the solid bed, the dial-post is shogged in the manner adopted in making a shogged welt or a commencing course on an ordinary machine; the skeleton needle-bed being held fixed meanwhile by the gear-wheel 11. Any usual method of shogging a needle may be adopted, according to the style of machine to which the beds are applied.

For increased stability and to keep the needle in position I connect the walls of the trick in such a manner that the connecting metal forms a bridge underneath which there is a passage provided for the sliding tail of the needle. (See Figs. 8, 10, 11, and 12.) In Figs. 8 and 11 the connecting metal is in the form of a ring 25, placed upon all of the walls of the tricks of the skeleton bed and soldered thereto.

To put a ring on the tricks of the solid bed would prevent the placing of one bed upon another. I therefore solder a small blank of metal 26 in the saw-gate, as seen in Figs. 10 and 12. (The walls of the tricks of my compound needle-bed are weaker than usual by reason of their peculiar construction, and the metal connection is specially adapted for strengthening them as indicated.)

In adapting my invention to a plain cylindrical bed the solid and skeleton needle-beds are similar in section. (See Figs. 13, 14, 15, and 16.) 27 is the solid bed, and 28 is the skeleton bed. Each bed is complete in itself and has provisions to hold a set of needles in a manner that they can be intersected by the needles of the other bed. Each trick has a wall of metal on both sides of the saw-gate independent of neighboring tricks. In the skeleton bed the tricks may be detachable, as shown in the straight bed. (See Figs. 17 and 18.) The skeleton bed is held circularly to the framework by the notch 29, while the solid bed 27 is held adjustably to the skeleton bed by the ordinary lever 30, pivoted to the base 3 by the screw 31.

Also in adapting my invention to a straight bed the solid and skeleton needle-beds are similar in section, (see Figs. 17, 18, and 19;) but I prefer in this case to make the tricks of the skeleton bed detachable and arrange for the base 32, for holding the detachable tricks 33, to be underneath the solid bed 34. The base 32 and tricks 33 together form the skeleton bed in this case. In order to do this, the solid bed has apertures 35, made by cutting away the metal, through which the lugs 36 of the detachable tricks 33 are passed. The base has slots 37, parallel with the needle-tricks 33, into which the lugs 36 of the detachable tricks 33 are drawn by screws 38 up against the base 32 and so secured. The detachable trick is shown in Figs. 17, 18, and 19, and also in Fig. 21 alone. The skeleton bed is moved sidewise by any ordinary means. One means is by a lever. (Shown in side view, Fig. 17, and plan, Figs. 18 and 19.) 39 is the lever, pivoted to a solid bed 34 by a screw 40. The inner end of the lever enters an aperture 41 (dotted lines) in the base of the skeleton bed. The lever is moved in either direction until the tricks of one bed press up against the tricks of the other bed. All the tricks carry needles. In Fig. 19 the lever has been shogged until the tricks and needles pair up into position for two-two rib. In Fig. 18 the lever has been shogged until the tricks and needles pair up unto position for one-one rib.

In using an ordinary cylinder-bed and my improved dial ribber-beds (see Fig. 4) to make a two-one rib fabric succeeded by a four-two rib fabric I arrange all the needles in the cylinder and all in the skeleton and solid beds. (See Fig. 5.) When the two-one fabric is finished, I shog the ordinary dial-post 4, bringing the alternating needles and their loops of the solid bed up to the alternating needles and their loops of the skeleton bed, causing them to group into pairs, and change the two-one to four-two rib fabric. (See Fig. 6.) When the four-two rib is finished, I reverse the positions and make two-one pattern. Other patterns of rib can be varied in a similar manner, according to the arrangement of needles in the plain-needle bed. For instance, supposing the needles to be arranged on four-two, as aforesaid, by withdrawing a cylinder-needle against every group of two rib-needles only three cylinder-needles will be between each group of two rib-needles, leaving each two rib-needles working over an empty cylinder-groove, producing three-two rib fabric. By shogging the solid bed until its needles work between the first two of the three cylinder-needles the needles will be arranged one rib, one cylinder, one rib, two cylinder, one rib, one cylinder, one rib, two cylinder needles, and so on all around, producing a fabric of a combination of ribs, viz: a one-one rib alternating with a two-one rib pattern.

In circular machines of a coarse nature where the length of loop will allow me to work the rib set of needles on two levels, as seen in Fig. 20, I use for the purpose of my invention a conical bed 42, adapted to carry alternating needles of the one set 43, and a dial-bed 44, adapted to carry the other alternating needles 45 of the same set, combined as shown, by which means I obtain similar results as aforesaid. The cone 42 is of the usual construction, having a lug 46 on the under side to engage with the ordinary dial-post 4 and is secured to the ribber-spindle 47 by the nut 48. The conical cap 49 and its cams 50 are attached to a tube 51, the cap being keyed to the tube. This tube 51 is mounted on the ribber-spindle 47 and is carried round with the rib-arm by the pin 52, connected to the tube through the adjustable plates 53 and boss 54, mounted on the tube. Dial-bed 44 is keyed to a tube 55 and held circularly by the gear-wheels 9, 10, and 11, meshing with the cylinder 1 and each other, as aforesaid in respect to Fig. 4. Tubes 51 and 55 and spindle 47 thread through the dial 44, the whole being supported by the ribber-arm 5. The cone 42 is held fixed by the ordinary dial-post 4, which is adjustable. The ribber-needles may be arranged in and out alternately, some ribber-needles being in the cone and some ribber-needles being in the dial to suit the combination of pattern of rib required. Where a needle is in the trick of the cone, the corresponding trick of the dial will be empty, and vice versa. By shogging the adjustable dial-post 4 the needles of the conical bed 42 will be adjusted laterally to or from the needles of the dial-bed 44, causing the needles to change their position, as aforesaid.

I declare that what I claim is—

1. A circular-knitting machine having a fixed plain bed and a ribber-bed and provisions comprising gear-wheels to maintain the fixed relation of the ribber-bed with the plain bed, substantially as and for the purposes set forth.

2. A knitting-machine provided with a needle-bed the needle-tricks of which are disposed in pairs and at an angle to the radius of the dial-plate, by virtue of which the needles of each pair converge to one point in their outward thrust, substantially as and for the purposes set forth.

3. In a knitting-machine adapted for a set of rib and a set of plain needles, a dual (or compound) needle-bed to receive and support the rib set of needles, the needles of the said needle-bed being so arranged relatively to each other that those of the one part alternate with those of the other part of the bed; the needles of the one part being disposed at an angle to the needles of the other part, substantially as and for the purposes set forth.

4. In a knitting-machine adapted for a set of rib and a set of plain needles, a dual (or compound) needle-bed to receive and support the set of rib-needles, the needles of said dual bed being so arranged relatively to each other, that those of one part alternate with the needles of the other part of the bed, one part carrying its needles on one line and the other part carrying its needles in another line.

5. A knitting-machine provided with two needle-beds, one a solid bed and one a skeleton bed capable of uniting with each other to form a dual or compound bed each part thereof being complete in itself, substantially as and for the purposes set forth.

6. A knitting-machine adapted for a set of rib and a set of plain needles, a dual (or compound) bed to receive and support the set of rib-needles, the needles of said bed being so arranged relatively to each other, that those of one part alternate with those of the other part of the bed, substantially as and for the purposes set forth.

7. A knitting-machine adapted for a set of rib and a set of plain needles, a dual (or compound) bed to receive and support the rib-needles, the needle-tricks of the one part being fixed laterally, and the tricks of the other part being adjustable laterally, the needle-tricks of the one part alternating with the needle-tricks of the other part, substantially as and for the purposes set forth.

8. A knitting-machine adapted for a set of rib and a set of plain needles, a dual (or compound) bed to receive and support the rib-needles, the needle-tricks of the one part being fixed laterally, and the tricks of the other part being adjustable laterally, the needle-tricks of the one part alternating with the needle-tricks of the other part, and means for adjusting one part relatively to the other part, substantially as and for the purposes set forth.

GEORGE FREDERICK STURGESS.

Witnesses:
THOMAS SCOTT,
WALTER EDWIN STURGESS.